United States Patent [19]

Kalotay et al.

[11] Patent Number: 5,349,872
[45] Date of Patent: Sep. 27, 1994

[54] STATIONARY COILS FOR A CORIOLIS EFFECT MASS FLOWMETER

[75] Inventors: Paul Z. Kalotay, Lafayette; Craig B. Van Cleve, Lyons, both of Colo.

[73] Assignee: Micro Motion, Inc., Boulder, Colo.

[21] Appl. No.: 110,164

[22] Filed: Aug. 20, 1993

[51] Int. Cl.[5] .............................................. G01F 1/84
[52] U.S. Cl. .............................. 73/861.38; 73/861.37
[58] Field of Search ............ 73/861.37, 861.38, 32 A; 335/199; 336/200

[56] References Cited

U.S. PATENT DOCUMENTS 4,949,583  8/1990  Lang et al. .................... 73/861.37

*Primary Examiner*—Richard E. Chilcot, Jr.
*Assistant Examiner*—Harshad Patel
*Attorney, Agent, or Firm*—Duft, Graziano & Forest

[57] ABSTRACT

A Coriolis flowmeter having a pair of parallel vibrating flow tubes equipped with a driver and sensors each comprising a fixed non-movable coil and a pair of magnets affixed to the vibrating flow tubes. Each coil magnetically cooperates with a unique pair of magnets. In a first embodiment, the coil is affixed to a non-movable member of the flowmeter. In another embodiment, the non-movable coil is affixed only to a spring sub-assembly which is affixed to the flow tubes which vibrate out-of-phase with respect to each other.

16 Claims, 5 Drawing Sheets

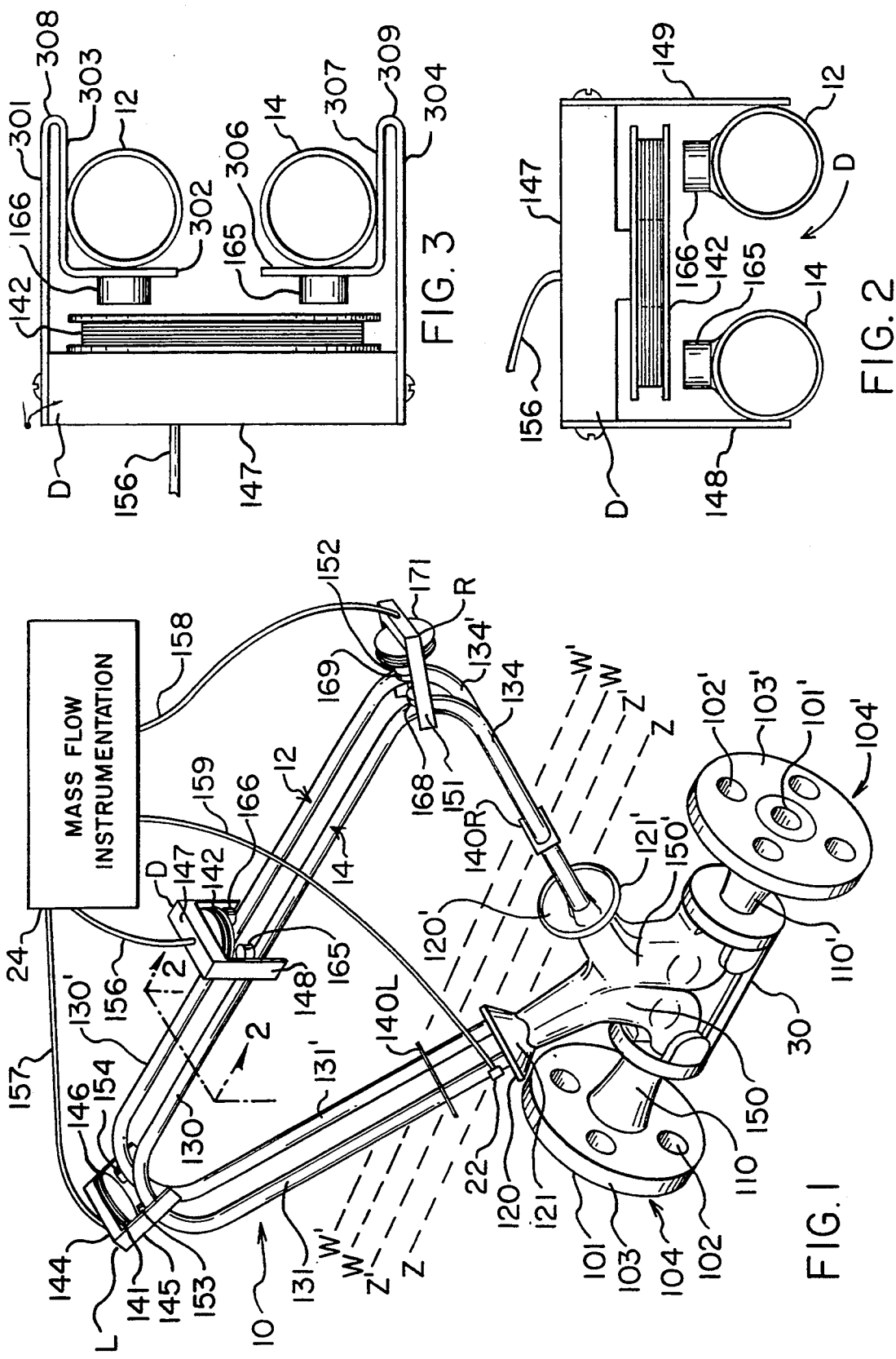

STATIONARY COILS FOR A CORIOLIS EFFECT MASS FLOWMETER

BACKGROUND OF THE INVENTION

This invention relates to a Coriolis-effect mass flowmeter and, in particular to a Coriolis effect mass flowmeter having lower cost, greater reliability, and better performance sensor pick-off and drive means.

PROBLEM

It is known to use Coriolis effect mass flowmeters to measure mass flow and other information for materials flowing through a conduit. As disclosed in U.S. Pat. Nos. 4,491,025 (to J. E. Smith, et al., of Jan. 1, 1985, and Re. 31,450 to J. E. Smith of Feb. 11, 1982, these flowmeters have one or more flow tubes of straight or curved configuration. Each flow tube configuration in a Coriolis mass flowmeter has a set of natural vibration modes, which may be of a simple bending, torsional or coupled type. Each flow conduit is driven to oscillate at resonance in one of these natural modes. Material flows into the flowmeter from a connected pipeline on the inlet side of the flowmeter, is directed through the flow tube or tubes, and exits the flowmeter through the outlet side. The natural vibration modes of the vibrating, fluid filled system are defined in part by the combined mass of the flow tubes and the material within the flow tubes.

When there is no flow through the flowmeter, all points along the flow tube oscillate with identical phase due to an applied driver force. As material begins to flow, Coriolis accelerations cause each point along the flow tube to have a different phase. The phase on the inlet side of the flow tube lags the driver, while the phase on the outlet side leads the driver. Sensors are placed on the flow tube to produce sinusoidal signals representative of the motion of the flow tube. The phase difference between two sensor signals is proportional to the mass flow rate of material through the flow tube.

Connecting wires to the coils on the moving tube presents a problem. This is generally dealt with in one of two ways. On larger meters, insulated wires are taped to the tube starting at a point near the brace bars where the tube's amplitude is near zero and extending up the tube to the coils. This method has a disadvantage in that the tape or glue and the wire insulation generally are high damping materials and their damping changes unpredictably with both time and temperature. Changing damping of the tubes of Coriolis meters can result in erroneous flow signals.

On small meters the damping induced errors become too large for the use of conventional wires and, therefore, thin flexible conductors (flexures) are arched to form connections from stationary terminals to terminals on the moving coils. These flexures have very little damping because they have no insulation or tape on them. Unfortunately, the flexures have very distinct natural frequencies and exciting them at a natural frequency can result in rapid failure. Also, their size and fragility makes manufacturing difficult.

SOLUTION

The problem of connecting wires to moving coils is avoided by the present invention which utilizes a magnet on each tube and a stationary coil positioned adjacent both magnets. The magnets are oriented such that they each have the same pole facing the planar coil and such that as the tubes move apart or together (out-of-phase motion), they traverse the coil radially and they generate additive voltages in the coil. With this geometry, in-phase motion of the tubes results in one magnet traversing the coil toward the coil center while the other magnet traverses the coil away from the coil center. The voltages generated by this motion subtract and cancel each other. This new geometry also filters out the in-phase motion as does a prior art moving coil embodiment, but without the problems of attaching wires to the moving coil.

The amplitude of the sinusoidal signal generated by the fixed coil design of the present invention is proportional to the strength of the magnetic field intercepting the coil. Since the field strength decreases with distance from the magnet, it becomes important to hold this distance constant with time, especially if the electronic signal processing uses a (non-zero) voltage level crossing measurement to determine delta t. Holding this distance (the gap) constant is difficult to accomplish using the straight forward approach of attaching the magnets to the tubes and the coils to the case of the meter because the tubes and case are traditionally fastened to each other at the meter manifold at considerable distance from the magnets and coils. Thus, very small manufacturing tolerances at the case-manifold-tube interface can result in large variances in the gap. The gap cannot be easily controlled as required. Furthermore, in operation there are modes of vibration which could be excited by ambient vibrations in which the tubes and case move in opposition to each other. This could change the gap in a cyclic manner and adversely impact flow measurement.

There are four methods by which this problem may be solved by the present invention. In the first, the coil is not fastened to the case but rather, to the tubes by way of leaf springs. The orientation of the springs allows the tubes to move parallel to the plane of the coil but holds the gap constant. The coil remains motionless because it is fastened between two identical springs whose far ends are displaced out of phase in equal and opposite directions. In-phase motion of the tubes or vibration of the coil is not evident in the voltage signal because of the voltage canceling.

The second method of dealing with the variable gap problem uses two coils per pickoff. The two coils are positioned parallel to each other and are fastened to the case and wired in series. The flow tubes are situated between the two coils and each tube has two diametrically opposed magnets fastened to it such that each magnet faces a coil. All four magnets (for the two coils on each flow tube) have the same pole (north or south) facing their respective coils. In this two coil geometry, if the case moves with respect to the tubes, the gap to one coil may get smaller but the gap to the opposite one will get larger by an equal amount. Since, for small displacements, the magnetic field strength is approximately linear with distance, the increase in voltage generated on the small gap side is compensated by the decrease in voltage generated on the large gap side. Thus this geometry is gap variation insensitive.

The third method of rendering the fixed coil insensitive to gap variations is to locate the coils about the tubes such that for the major vibration modes between the case and tubes, the gaps do not change. The primary mode between the tubes and the case is one in which the tubes and case oscillate in the plane of the tubes. The tubes oscillate in-phase with each other but-out-of phase with the case. This will be referred to as the case lateral mode. It is generally the only mode with a low enough frequency so that the vibration amplitude is significant. The center of mass of the system is in the vicinity of the manifolds, the tubes and case oscillate in a rotational mode about this center of mass. By orienting the coils such that their planes are tangential to a sphere whose center coincides with the center of mass, one ensures that the gap will remain constant despite the case lateral mode. The only relative velocity resulting from this mode will be tangent to the sphere and in the plane of the coils. Tangential case-tube motion perpendicular to the flow tubes is in-phase tube motion which is canceled out. Tangential motion parallel to the flow tubes, the case lateral mode, could cause problems if the amplitude is great enough. By making the coils rectangular, oscillation in this direction results in the magnets travelling up and down the straight legs of the coils with no change in generated voltage.

Finally, the coils can also be oriented in such a manner that the gaps of both left and right pickoffs get larger and smaller in-phase with each other. Phase measurement is insensitive to amplitude as long as the ratio of amplitudes generated by the two pickoffs remains constant. In a "normal" pickoff arrangement where they are both located on the outside of the flow tube bends, one gap increases while the other decreases in response to the case lateral mode. If, however, one pickoff is located on the outside of the flow tube bend and the other is located on the inside of the bend, then the gaps of the left and right pickoffs will vary in-phase with each other and phase measurement is not affected.

For simplicity, until now, only pickoff coils have been discussed. The above logic also applies to drivers with the exception that in general there is no concern for linearity or phase of the drive signal. Thus the driver gap is only important for drive efficiency considerations. Since the driver is usually located at the apex of the tubes, the coil plane is normally tangent to a sphere whose center is at the center of mass and no further action is needed to hold the gap constant.

It can be seen from the above that the present invention solves the problem of extending electrical connections to the coils of driver and sensor elements mounted on the vibrating tubes of Coriolis effect flowmeters. This interconnection problem is solved by either mounting the coils physically on a stationary member so that the coils magnetically cooperate with associated magnets physically mounted to the vibrating flow tubes. Alternatively, the coils are held stationary by physically attaching them to the vibrating flow tubes by a spring means which maintains the coils motionless with respect to the out-of-phase driven vibrations of the flow tubes.

DESCRIPTION OF THE DRAWING

The above and other advantages and features of the invention may be better understood from a reading of the following description thereof taken in conjunction with the drawing in which:

FIG. 1 discloses a first exemplary embodiment of the invention showing driver and sensor coils being connected by leaf spring means to a pair of flow tubes;

FIG. 2 is a cross-sectional view taken along Section 2—2 of FIG. 1;

FIG. 3 shows a coil and magnets comprising part of a spring assembly that is affixed to a pair of flow tubes;

DETAILED DESCRIPTION

Description of FIGS. 1 and 2

Figure 4:
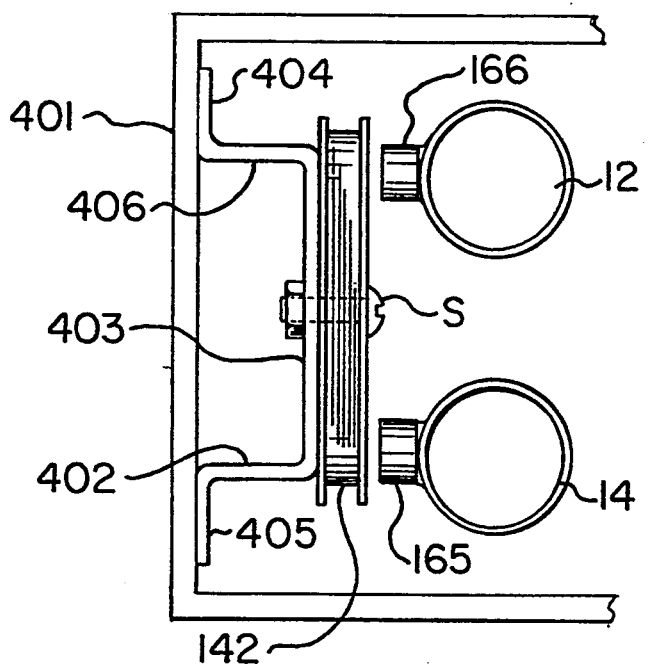
FIG. 4 shows a coil affixed to a frame of the Coriolis effect meter.

A typical Coriolis effect mass flowmeter 10 is illustrated in FIG. 1 as having two cantilever mounted flow tubes 12, 14 affixed to a manifold body 30 so as to have substantially identical spring constants and moments of inertia about their respective out-of-phase bending axes W—W and W'—W'.

A drive coil and magnet D are mounted at a midpoint region between the top portion 130 and 130' of flow tubes 12, 14 to oscillate flow tubes 12, 14 out of phase about axes W—W and W'—W'. Left sensor L and right sensor R are mounted near the respective ends of the top portions of flow tubes 12, 14 to sense the relative movement of flow tubes 12, 14. This sensing may be done either by measuring the movement of the top ends of the flow tubes 12, 14 through their zero crossings or by measuring the velocity of movement of the flow tubes. Flow tubes 12 and 14 have left side legs 131 and 131' and right side legs 134 and 134'. The side legs converge downwardly toward each other and are affixed to surfaces 120 and 120' of manifold elements 121 and 121'. Brace bars 140R and 140L are brazed to the legs of flow tubes 12, 14 and serve to define the axes W—W and W'—W' about which the flow tubes oscillate out of phase when driver D is energized over path 156. The position of axes W—W and W—W' is determined by the placement of brace bars 140R and 140L on flow tube side legs 131, 131' and 134, 134'.

Temperature detector 22 is mounted on side leg 131 of flow tube 14 to measure the flow tube's temperature and the approximate temperature of the material flowing therein, This temperature information is used to determine changes in the spring constant of the flow tubes. Driver D, sensors L, R and temperature detector 22 are connected to mass flow instrumentation 24 by paths 156, 157, 158 and 159. Mass flow instrumentation 24 may include a microprocessor which processes the signals received from sensors L, R and detector 22 to determine the mass flow rate of the material flowing through flowmeter 10 as well as other measurements, such as material density and temperature. Mass flow instrumentation 24 also applies a drive signal over path 156 to driver D to oscillate tubes 12 and 14 out-of-phase about axes W—W and W'W'.

Manifold body 30 is formed of casting 150, 150'. Casting elements 150, 150' are attachable to a supply conduit and exit conduit (not shown), by flanges 103, 103'. Manifold body 30 diverts the material flow from the supply conduit into flow tubes 12, 14 and then back into an exit conduit. When manifold flanges 103 and 103' are connected via inlet end 104 and outlet end 104' to a conduit system (not shown), carrying the process material to be measured, the material enters manifold body 30 and manifold element 110 through an inlet orifice (not shown) in flange 103 and is connected by a channel (not shown) having a gradually changing cross-section in casting element 150 to flow tubes 12, 14. The material is divided and routed by manifold element 121 to the left legs 131 and 131' of flow tubes 14 and 12, respectively. The material then flows through the top tubes elements 130, 130' and through the right side legs 134 and 134' and is recombined into a single stream within flow tube manifold element 121'. The fluid is thereafter routed to a channel (not shown) in exit casting element 150' and then to exit manifold element 110'. Exit end 104' is connected by flange 103' having bolt holes 102' and orifice 101' to the conduit system (not shown).

The driver element D is shown in further detail in FIG. 2 which is a cross-sectional view taken along line 2—2 of FIG. 1. As shown more clearly in FIG. 2, the driver element comprises a right spring 149, a left spring 148, a top bar 147 and a coil 142 mounted to bar 147. These elements comprise at sub-assembly that is mounted at the distal ends of springs 148 and 149 to the outer surfaces of flow tubes 14 and 12, respectively. Magnet 166 is affixed to the top exterior surface of flow tube 12 while magnet 165 is affixed to the top exterior surface of flow tube 14. The magnets are mounted so that their north poles face the same direction (i.e. toward the coil). The lower plane of coil 142 is of sufficient area so as to compass the magnetic fields of both magnets 165 and 166. When operated as a driver, the elements of FIG. 2 respond to the reception of an AC drive signal to generate an electro-magnetic field which causes the magnets and the flow tubes to which they are attached to oscillate out of phase with respect to each other. In so doing, the flow tubes, including the material flowing within the flow tubes, are caused to move inwardly and outwardly with respect to each other at the resonant frequency of the flow tube structure.

The left sensor element L and the right sensor element R comprise elements similar to those of the driver element D shown in FIG. 2. The coil of each sensor element responds to the relative motion of the flow tubes and their associated magnets to generate an output signal representing the flow tube movements. The output signals from the coils of sensor elements L and R are extended over path 157 and 158 on FIG. 1 to the mass flow instrumentation element 24 which processes these signals and generates output information representing the desired characteristics to be measured for the material flowing within flow tubes 12 and 14.

When operated as sensors, the magnets of elements L and R respond to the out-of-phase movements of the flow tubes 12, 14 to generate additive signals representing the relative velocity of the flow tubes with respect to each other. The signals generated by each of the two magnets of the sensor for in-phase vibrations cancel and thus produce no resultant output over the conductors 157 or 158 of the sensors L and R.

Description of FIG. 3

FIG. 3 discloses an alternative embodiment for associating a coil 142 with a pair of magnets 165 and 166 and flow tubes 12 and 14. In the embodiment of FIG. 2, the magnets 165 and 166 are directly affixed to the exterior surface of flow tubes 12 and 14. This requires an operation (brazing, welding, etc) to affix the magnets to the flow tubes. The embodiment of FIG. 3 differs from that of FIG. 2 in that both the coil and the magnets are affixed to a separate spring sub-assembly comprising bar 147 and spring elements 301–304 and 306–309. Coil 142 is affixed to bar 147 in the same manner as shown for FIG. 2. Magnets 165 and 166 are affixed to right angle end portions 306 and 302, respectively, of U-shaped spring members 304 and 301. Spring member 301 has a 180° curved end portion 308, and a portion 303 which at its other end has a 90° bend and an end portion 302. Magnet 166 is affixed to one side of spring portion 302 while the other surface of spring portion 302 is fixed by welding or brazing to flow tube 12. One surface of spring portion 303 is also affixed to flow tube 12. Spring member 304 is similar to spring member 301.

The embodiment of FIG. 3 is advantageous over that of FIG. 2 in that it permits the coils and magnets to be fabricated as a separate sub-assembly in advance and then affixed by any suitable attaching means to flow tubes 12 and 14. Spring members 301 and 304 are selected with the desired elasticity and flex so that bar 147 and its cable 156 extending to coil 142 are essentially stationary and motionless with respect to the out-of-phase vibrations of flow tubes 12 and 14. For this reason, conductors 156 are not subject to vibration and, in turn, their rigidity, damping or other mechanical characteristics do not adversely affect the out-of-phase vibrations of flow tubes 12 and 14.

As is the case for FIG. 2, the elements comprising the embodiment of FIG. 3 are shown to comprise driver D of FIG. 1. However, except for the characteristics of coil 142, the elements for the driver D are identical or comparable to those of the left and right sensors L and R of FIG. 1. Therefore the structure for the sensor elements L and R identical to that shown on FIGS. 2 and 3. Elements 151, 152, 168, 169 and 171 comprise sensor R.

Description of FIG. 4

FIG. 4 discloses another alternative arrangement for associating a non-moving coil 142 with magnets 165, 166 affixed to vibrating flow tubes 12 and 14. Magnets 165 and 166 are directly affixed to flow tubes 12 and 14. Coil 142 is positioned with its plane proximate, but spaced apart, from the end surfaces of magnets 165 and 166 so as to define a predetermined gap between the plane of coil 142 and ends of magnets 165 and 166. Coil 142 is affixed by any suitable means such as a screw S to a bracket having elements 402–406. The leg portions 404 and 405 of the bracket are affixed to the inner surface of flowmeter shell 401. Shell 401 covers the flow tube assembly 12 and 14 of FIG. 1.

The embodiment of FIG. 4 has the advantage of less complexity over that of the embodiments of FIGS. 2 and 3; however, the embodiment of FIG. 4 has the accompanying disadvantages that the bracket and coil must be positioned with precision with respect to the shell 401, and the shell 401 must then be mounted with precision on the meter assembly so that the gaps between magnets 165 and 166 and coil 142 are equal. It is also necessary when the flowmeter is in operation and subject to ambient temperatures, that the expansion of the case or shell 401 due to temperature changes not affect unequally the size of the gaps between the magnets and the coil 142.

Also, a potential problem may exist when case-vibrations relative to the tubes creates cyclicly changing gaps.

Figure 5:
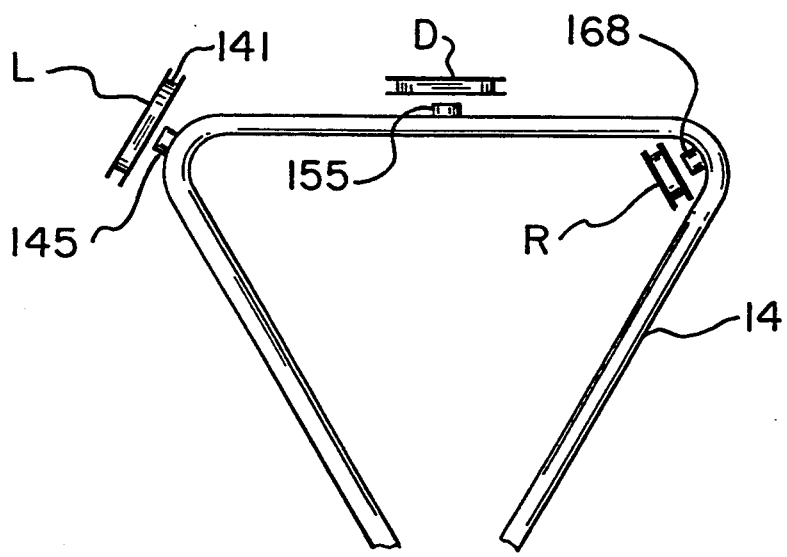
FIG. 5 discloses another possible embodiment of the invention wherein magnets and cooperating coils of two sensors are positioned on opposite surfaces of a pair of flow tubes.

Description of FIG. 5

The embodiment of FIG. 5 is identical in all respects to that of FIG. 1 with the exception that the right hand sensor coil R and magnet 168 for flow tube 14 are positioned on the interior portion of the flow tubes rather than on the exterior portion as is the case for sensor R and its associated elements in FIG. 1.

It should be noticed that on FIG. 5 the magnets and coils of the left sensor element L and the magnet and coils for the right sensor R are both on the inner and outer surfaces, respectively, of the flow tubes 12 and 14. This arrangement is advantageous for lateral in-phase vibrations or movements of the flow tubes since if the sensor elements L and R move to the left so that the gap between their respective coils and magnets increases, they both increase at the same time and by the same amount. Alternatively, if the sensor elements L and R move to the right, the gaps between the magnets and coils of each sensor decreases simultaneously. This arrangement prevents the gap of one sensor from increasing while that of the other sensor may be decreasing. If this were the case, the relative amplitudes of the output signals from each sensor would no longer be equal and would make more difficult the signal processing function within the mass flow instrumentation element 24.

FIG. 5 discloses only the front view of the meter of FIG. 1, and therefore only flow tube 14 and its magnets 145, 155, and 168 are shown. Flow tube 12 is not shown on FIG. 5 but is understood to be positioned immediately behind flow tube 14 and is further understood to have affixed to it the same magnets and other elements shown in FIG. 1.

Figure 7:
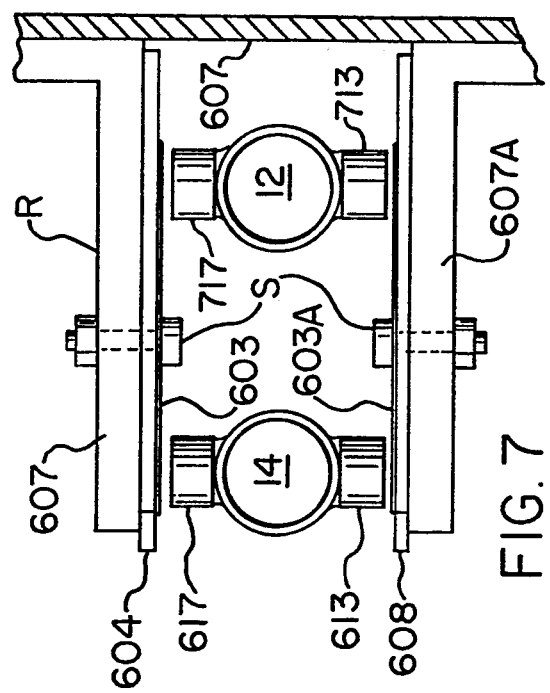
FIG. 7 is a cross-sectional view taken along line 7—7 of FIG. 6.
Figure 8:
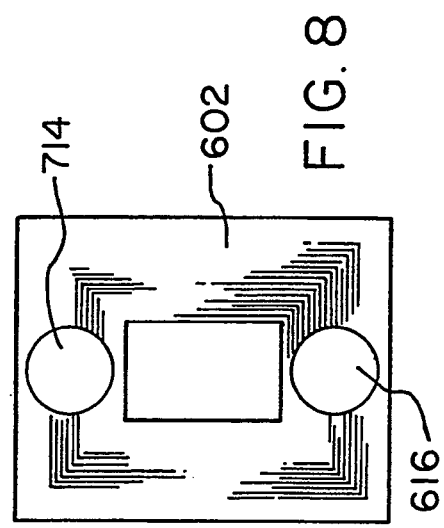
FIG. 8 discloses a flat rectangular coil.
Figure 6:
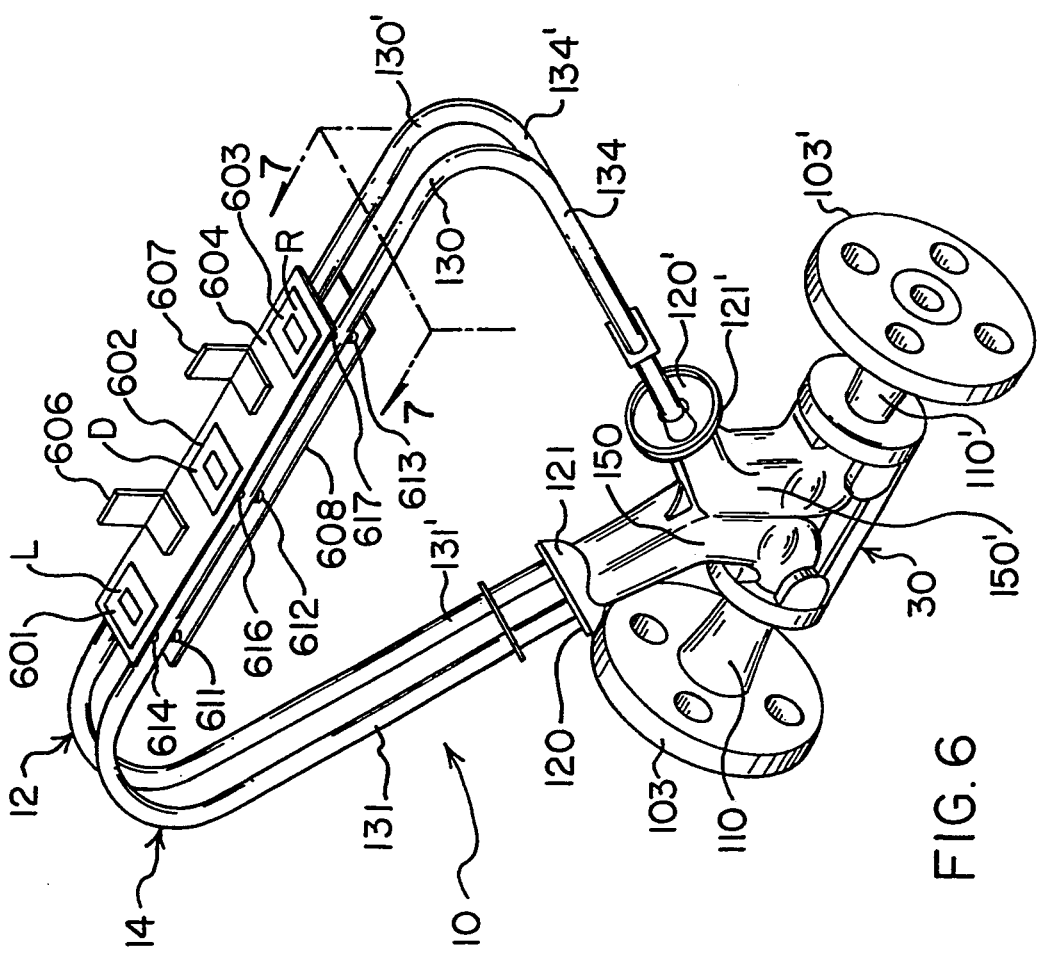
FIG. 6 discloses a flowmeter having printed circuit coils attached to the fixed casing of the flowmeter and having associated magnets positioned on both top and bottom portions of a pair of flow tubes.

Description of FIGS. 6, 7, and 8

FIGS. 6, 7, and 8 together disclose an alternative embodiment of the invention wherein a pair of printed circuit (PC) boards each containing three coils are positioned above and below the top leg of a pair of flow tubes equipped with cooperating magnets to perform the driver and sensor function of the embodiment of FIG. 6. On FIG. 6, the top PC circuit board is designated as element 604. PC board 604 is positioned above flow tubes 12 and 14. The lower PC circuit board is element 608 and it is positioned below the top leg of the flow tubes 12 and 14. Each PC circuit board has a flat coil embedded within its middle portion as well as a flat embedded coil in each of its end portions. The middle coil of PC circuit board 604 is 602 and the left and right end coils are 601 and 603. Although not visible specifically on FIG. 6, the lower PC circuit board 608 has three coils corresponding to those on PC circuit board 604 with the three coils of PC board 608 being positioned parallel to and immediately below the corresponding coils of board 604.

On FIG. 6, magnets 611, 612, and 613 are positioned and affixed to the lower portion of flow tube 14 so as to cooperate with the coils on the left end, middle, and right end, respectively, of lower PC printed circuit board 608. Magnets 614, 616, and 617 are affixed to the top surface of flow tube 14 so as to cooperate respectively with coils 601, 602, and 603 of printed circuit board 604. Circuit boards 604 and 608 are affixed by brackets, such as 606 and 607 for circuit board 604, to the case (not shown) of the flowmeter.

FIG. 7 comprises a cross-sectional view taken along line 7—7 of FIG. 6 and shows in further detail the structural elements associated with sensor R. The elements that are shown in further detail on FIG. 7 include the coils 603 on PC board 604 and its corresponding coil 603A on PC board 608. The magnets associated with flow tube 12 are not shown on FIG. 6. However, these magnets are shown on FIG. 7 for the sensor element R and are elements 713 and 717.

It should be noted that the coils embedded with the circuit boards 604 and 608 are rectangular rather than circular. These coils are shown in detail in FIG. 8 where the illustrated coil is assumed to be driver coil 602 of FIG. 10. The front magnet 616 is affixed to the top of flow tube 14. Its counterpart magnet is affixed to flow tube 12 and is designated as element 714 on FIG. 8. The other coils, 601 and 603, of circuit board 604 and the three corresponding coils of circuit board 608 are also rectangular and identical to coil 602 shown on FIG. 8.

It should also be noted that a simplification of the sensor R assembly can be achieved by using one single magnet replacing magnets 613 and 617, and similarly magnets 713 and 717. These longer, single piece magnets can be attached to the outside rather than to the top and bottom of tubes 12 and 14. Operation of these magnets is identical to the operation of the two-part assembly FIG. 7. In general, the physical distance of the two tubes determines the practical coil-dimensions, and in particular, the width of the coil. The placement of the magnets on the sides of the tubes also enables an extension of the width of the pc-coil, thereby reducing its sensitivity to in-phase motions and vibrations. Relative motion between the magnets and the long, parallel conductors of the PC coil in the direction of the tube axis does not generate any voltage or does not affect the voltages generated by tube-vibrations.

The flat rectangular coils embedded in the PC circuit boards are advantageous in that they are less expensive and more resistant to ambient temperature effects than are discrete coils fabricated from magnet wire. The coils of FIG. 8 are more easily sealed than are discrete coils. Also, there are no thin wires to contend with in the manufacturing and assembly process with respect to the embedded coils. The embedded coils also have less bulk and weight and are otherwise advantageous compared to their discrete counterparts, mainly because of the very repeatable manufacturing process.

Magnets 616 and 714 are shown associated with coil 602 on FIG. 8. These magnets move out-of-phase with each other in a vertical direction (on FIG. 8) during operation. This is true regardless of whether the specific structure shown in FIG. 8 represents a driver or a sensor. It should be noted with respect to FIG. 8 that the motion of the magnets enables the magnetic field generated by the magnets to cross essentially straight, rather than curved, conductors. This eliminates harmonics when the coils and magnets are operated as sensors and improves signal linearity by reducing the amount of harmonics that would be generated in the output signal of the sensor coils if the magnetic fields of the associated magnets traversed curved rather than straight conductors.

Figure 9:
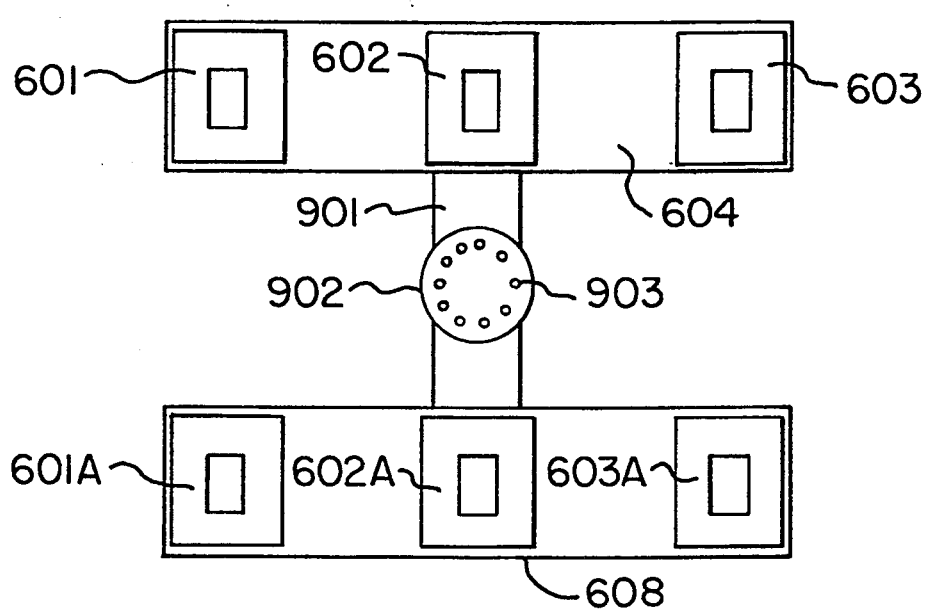
FIG. 9 shows a flexure assembly comprising a pair of printed circuit coils, connecting circuitry and arranged to accommodate an electrical connector.
Figure 10:
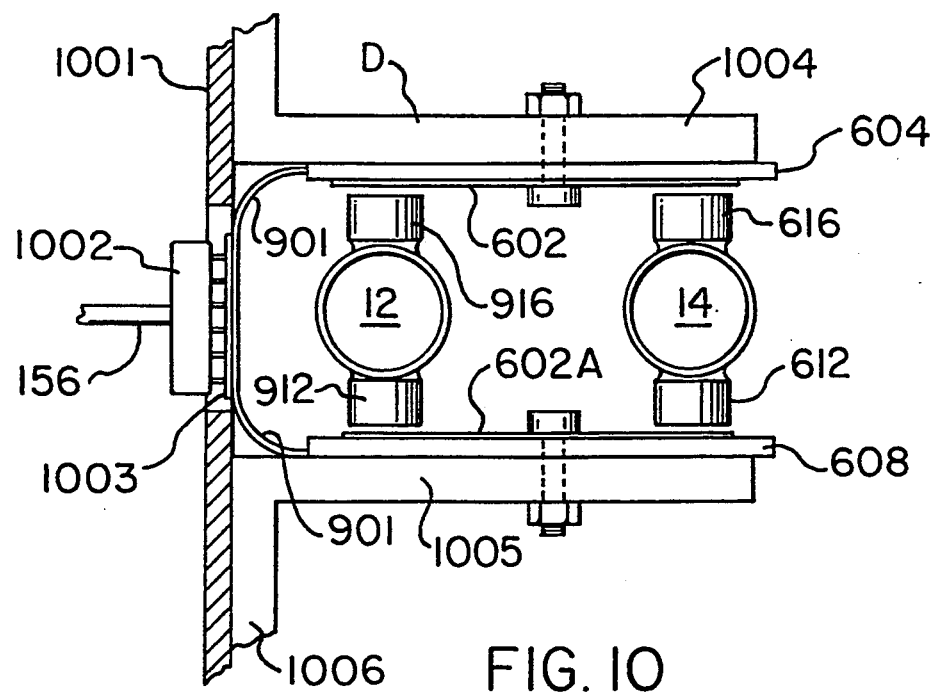
FIG. 10 shows a connector of the flexure of FIG. 9 inserted into an opening of an outer shield of the Coriolis effect meter.

Description of FIGS. 9 and 10

The interconnection between the coils of FIG. 6 and 7 and the associated electronics is not shown on FIGS. 6 and 7. FIGS. 9 and 10 disclose an advantageous embodiment of the present invention wherein the corresponding coils of circuit board pair 604 and 608 are connected in series aiding with respect to each other. FIGS. 9 and 10 further show the manner in which these coils can be connected to the mass flow instrumentation element 24.

FIG. 9 discloses the circuit board pair 604 and 608 with the three coils embedded in each circuit board. The coils of circuit board 604 are 601, 602, and 603. The corresponding coils of circuit board 608 have the same designation with the suffix of A. The corresponding coils of two circuit boards are connected in series. The driver coils 602 and 602A are connected in series as are the 601 and 603 family of sensor coils. The coils of the two circuit boards are interconnected with one another by means of the flexible circuit 901 extending between board 604 and board 608. Flexible circuit 901 is connected at its middle portion 902 to a printed circuit connector having connector pins 903. These pins are adapted to cooperate with a mating connector so as to permit the coil circuitry of the circuit boards to be connected to the drive signal source and input circuitry of electronics element 24.

FIG. 10 illustrates how the circuit boards and connector pins of FIG. 9 may be connected to the structure of the flowmeter. The outer shell 1001 of the flowmeter is shown in partial detail. This shell has an opening which receives connector 1002 and its pins 1003. Shell 1001 is affixed to one leg of each of a pair of brackets 1004 and 1005 with the two circuit boards being affixed to the other leg of each bracket. For example, with respect to bracket 1004, its left leg is connected to the shell 1001 of the flowmeter while its other leg is connected by its bottom surface to PC board 604 containing the coil 602. FIG. 10 represents a cross-sectional view of driver D of FIG. 6. Printed circuit board 604 contains coil 602 for driver D whose effective plane is parallel to the top end surfaces of magnets 916 and 616 which, in turn, are affixed to flow tubes 12 and 14 respectively. The gaps between magnets 916, 616 and the coil 602 is kept uniform in operation. This is true both with respect to the driver element as well as coils and associated magnets of the sensor elements. The lower surfaces of flow tubes 12 and 14 of FIG. 10 are affixed to magnets 912 and 612, respectively, which cooperate with the plane of coil 602A of driver D of FIG. 10.

Figure 11:
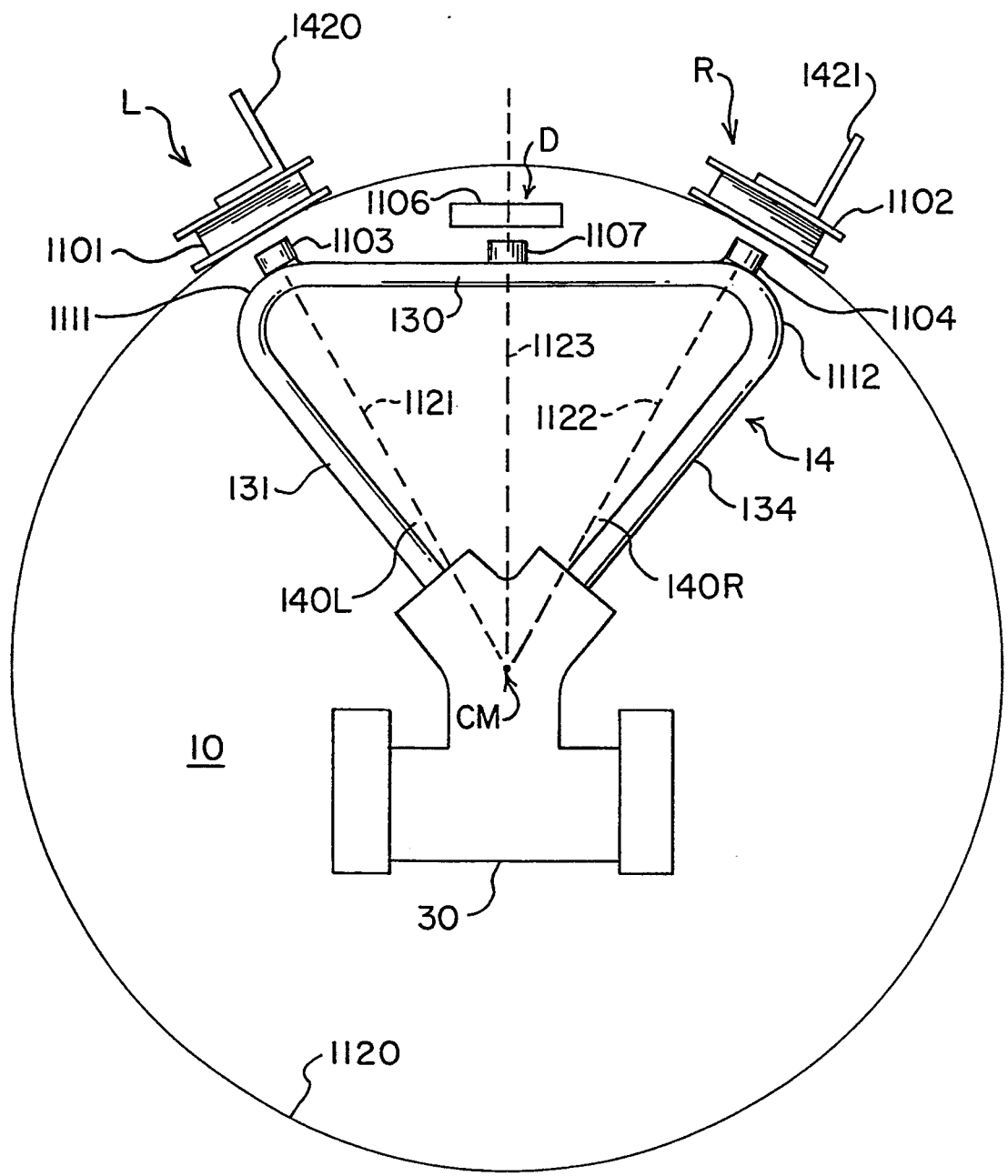
FIG. 11 shows another alternative embodiment wherein sensor coils are positioned tangential to a sphere whose center coincides with the center of mass of the flowmeter.

FIG. 11 discloses an alternative embodiment that minimizes problems of changes in the gap dimensions due to oscillations or relative movement between magnets affixed to flow tubes and sensor coils affixed to a stationary member of the flowmeter. The embodiment of FIG. 11 is structurally similar to that of FIG. 1 in that it comprises a flowmeter 10 meter casing 30 to which are affixed a pair of flow tubes 14 and 12 of which only flow tube 14 is visible in FIG. 11. A left sensor L and a right sensor R are positioned at the left and right ends, respectively, of a substantially straight top portion 130 of the flow tube. Magnets 1103 and 1104 together with their counterparts for tube 12 (not shown) on FIG. 11 are affixed to the flow tubes. The left coil 1101 and the right coil 1102 are affixed by brackets 1420 and 1421 to a stationary member (not shown).

In operation, the flow tubes and connected magnets may oscillate in-phase with respect to sensor coils L and R which are rigidly affixed to the flowmeter. Without more, this oscillation, which is due to ambient conditions such as vibration of the system of which the flowmeter is a part, can cause the distances (gaps) between the coils and the magnets to change. This change can affect the signal amplitude of the coils L and R and, in turn, complicate or degrade the signal processing function. The embodiment of FIG. 11 minimizes the consequences of this relative movement of the magnets and coils by mounting the sensors L and R as shown so that they are tangential to a circle 1120 whose center CM is the spherical center of dynamic mass of the flow tube system. Since coils 1101 and 1102 are rectangular as shown in FIG. 8, the relative movement of the flow tube and its magnets with respect to the coils causes them to move on a radius 1121 and 1122 about the spherical center of mass CM. This relative movement does not change the gap size but merely displaces the magnets laterally with respect to the coils. This lateral displacement is in phase with regard to the pair of sensor magnets at each end of the top portion 130 of the flow tubes. This in-phase movement effectively cancels the signals generated by each magnet so that each sensor coil generates no output signal as a result of this in-phase lateral movement. The structure of FIG. 11 is spherical in nature so that the above-discussed in-phase relative movement of the flow tubes generates no output signal in coils L and R regardless of the direction of movement of the flow tubes; i.e., left or right or in and out as shown on FIG. 11.

The advantages of the embodiment of FIG. 11 are limited to a structure wherein the coils 1101 and 1102 are rigidly affixed to an external member. The advantages of the embodiment of FIG. 11 are not applicable to the embodiments of FIGS. 2 and 3 which by their very nature preclude the magnets and coils from in-phase relative movement.

It can be seen from the above that the structure of the present invention advantageously provides means for mounting the sensor and drive coils of the Coriolis flowmeter in a non-movable manner so that the coils do not move as the magnets and flow tubes with which the coils are associated vibrate out-of-phase. This non-movable mounting of the coils permits the coils to be connected to associated electronics by means of electrical conductors whose characteristics do not alter the performance or accuracy of the output information generated by the Coriolis flowmeter in its operation.

It is expressly understood that the claimed invention is not to be limited to the description of the preferred embodiment but encompasses other modifications and alterations within the scope and spirit of the inventive concept.

We claim:

1. In a Coriolis flowmeter having first and second flow tubes positioned substantially parallel to each other;
    means for vibrating said first and second flow tubes out of phase with respect to each other;
    sensor means for detecting the movement of said flow tubes resulting from material flow through said vibrating flow tubes;
    said sensor means comprising:
    at least two magnets each of which is affixed to a corresponding portion of different ones of said flow tubes;

a coil proximate said magnets and having a substantially flat surface aligned substantially parallel to a plane defined by a surface of both of said magnets;

means for maintaining said coil in a substantially non-movable fixed position as said magnets vibrate out of phase with respect to each other;

said coil being responsive to the vibration of said magnets affixed to said vibrating flow tubes for generating a signal representing the relative movement of said vibrating flow tubes, said movement including the movement due to Coriolis forces generated by material flow within said flow vibrating flow tubes.

2. The Coriolis flowmeter of claim 1 wherein said means for maintaining comprises:

bracket means affixed to said coil and to a non-movable member of said flowmeter for maintaining said coil in said fixed position.

3. The Coriolis flowmeter of claim 1 wherein said means for maintaining includes a spring assembly comprising:

a first spring member having a flat body portion and an end portion affixed to a first one of said flow tubes;

a second spring member having a flat body portion and an end portion affixed to a second one of said flow tubes;

a block member connected between a second end portion of each of said first and second spring members;

means for connecting said coil to a mid portion of said block member; and wherein said block member and said coil remain substantially fixed and non-movable in response to the out of phase vibration of said flow tubes.

4. The Coriolis flowmeter of claim 3 wherein:

said first and second spring members each have an elongated axis interconnecting their first and second ends with the elongated axis of each of said spring members being parallel to each other, and wherein said block member has an elongated axis perpendicular to said elongated axis of each of said spring members.

5. The Coriolis flowmeter of claim 1 wherein said means for maintaining includes a spring assembly comprising:

first and second partially U-shaped and substantially flat spring members;

each of said spring members having a first end portion connected to a right angled end member one side of each of which is affixed to a different one of said flow tubes and the other side of each of which is affixed to a different one of said magnets;

a block member connected between a second end of each of said first and second U-shaped spring members;

means for connecting said coil to a mid portion of said block member; and wherein said block member and said coil remain substantially fixed and non-movable in response to the out of phase vibration of said flow tubes.

6. The flowmeter of claim 1 wherein each of said sensors are positioned on different ends of a top portion of said flowmeter and wherein said flowmeter further comprises:

means for affixing said coil of each sensor to a fixed member of said flowmeter so that a plane of said coil is tangential to a circle whose center is coincident with a spherical center of vibrational mass of said flowmeter;

said magnets being affixed to said flow tubes so that a plane of said magnets is parallel to said plane of one of said coils;

wherein said magnets and said coils cooperate so that a movement of said flow tubes about said spherical center of mass while said coils remain in a fixed position does not vary the distance between said magnets and said coils.

7. A Coriolis flowmeter having first and second flow tubes positioned substantially parallel to each other;

each of said flow tubes having a substantially straight portion adjacent to and parallel to each other;

means for vibrating said flow tubes out of phase with respect to each other;

a first substantially flat printed circuit board positioned on one side of said substantially straight portion of each of said flow tubes;

a second substantially flat printed circuit board positioned on the other side of said substantially straight portion of each of said flow tubes;

a plurality of sensor coils each of which is positioned on a different end of a different one of said printed circuit boards;

each of said flow tubes having a plurality of magnets affixed thereto with each magnet being positioned between the flow tube to which it is affixed and one of said sensor coils and wherein each of said sensor coils is operative to sense the magnetic field emanating from a different pair of said magnets affixed to different ones of said flow tubes;

means for maintaining said printed circuit boards substantially fixed and non-movable as said magnets and flow tubes vibrate out of phase with respect to each other;

said sensor coils being responsive to the movement of said magnets for generating signals representing the relative movement of said tubes with respect to each other as they vibrate out of phase with respect to each other while being twisted by Coriolis forces generated due to material flow within said vibrating flow tubes.

8. The flowmeter of claim 7 wherein said means for vibrating comprises:

a plurality of driver coils each of which is positioned on a mid portion of a different one of said printed circuit boards;

a plurality of driver magnets each of which is affixed to a mid-portion of said substantially straight portion of different one of said flow tubes;

each of said driver magnets being positioned between the flow tube to which it is affixed and one of said driver coils with at least two magnets being positioned between each driver coil and said pair of said flow tubes;

each of said driver coils being responsive to a receipt of a drive signal for vibrating said magnets and affixed flow tubes out of phase to each other when a drive signal is applied to said driver coils.

9. The flowmeter of claim 7 in combination with:

flexure means extending between said printed circuit boards for interconnecting corresponding ones of said coils on each of said printed circuit boards;

connecting means on a mid portion of said flexure means for providing electrical access to said coils on said printed circuit boards;

said connecting means being adapted to be inserted into an opening in an outer shell of said flowmeter when assembled for enabling the electrical interconnection of said coils and external circuitry associated with said flowmeter.

10. A method of operating a Coriolis flowmeter having first and second flow tubes positioned substantially parallel to each other;

means for vibrating said first and second flow tubes out of phase with respect to each other; and sensor means for detecting the movement of said vibrating flow tubes resulting from material flow through said vibrating flow tubes;

said method comprising the steps of:

affixing each of a pair of magnets to a corresponding portion of different ones of said flow tubes;

positioning a coil proximate said magnets with said coil having a substantially flat surface aligned substantially parallel to a plane defined by an end of both of said magnets; and maintaining said coil in a substantially non-movable fixed position as said magnets affixed to said vibrating flow tubes vibrate out of phase with respect to each other;

said coil being responsive to said vibration of said magnets for generating a signal representing the relative movement of said vibrating flow tubes as they are twisted by Coriolis forces generated by material flow within said flow tubes.

11. The method of claim 10 wherein said steps of maintaining comprises the step of:

affixing a bracket means to said coil and to a frame of said flowmeter for maintaining said coil in said fixed position.

12. The method of claim 10 wherein said step of maintaining comprises the steps of:

affixing a first end portion of a first spring member to a first one of said flow tubes;

affixing a first end portion of a second spring member to a second one of said flow tubes;

connecting a block member between a second end of each of said first and second spring members;

connecting said coil to a mid portion of said block member;

wherein said block member and said coil remain fixed and non-movable in response to the out of phase vibration of said flow tubes.

13. The method of claim 10 wherein said step of maintaining includes the steps of:

connecting first and second partially U-shaped spring members each having a substantially flat body portion and also having a first end connected to a right angled end member one side of each of which is connected to a different one of said flow tubes and the other side to a different one of said magnets;

connecting a block member between a second end of each of said first and second partially U-shaped spring members;

connecting said coil to a mid portion of said block member;

wherein said block member and said coil remain substantially fixed and non-movable in response to the out of phase vibration of said flow tubes.

14. A method of operating a Coriolis flowmeter having first and second flow tubes positioned substantially parallel to each other;

each of said flow tubes having a substantially straight portion adjacent the substantially straight portion of the other one of said flow tubes; and means for vibrating said flow tubes out of phase with respect to each other;

said method comprising the steps of:

positioning a first substantially flat printed circuit board on one side of said substantially straight portion of each of said flow tubes;

positioning a second substantially flat printed circuit board on the other side of said substantially straight portion of each of said flow tubes;

maintaining said printed circuit boards substantially fixed and non-movable as said magnets and flow tubes vibrate out of phase with respect to each other;

positioning a different one of a plurality of sensor coils on a different end of a different one of each of said printed circuit boards;

affixing a plurality of magnets to each of said flow tubes with each magnet being positioned between the flow tube to which it is attached and one of said coils wherein two of said magnets are positioned between each of said coils and said flow tubes;

said sensor coils being responsive to the movement of said magnets for generating signals representing the relative movement of said tubes with respect to each other as they vibrate out of phase with respect to each other while being twisted by Coriolis forces generated due to material flow within said vibrating flow tubes.

15. The method of claim 14 wherein said step of vibrating comprises the step of:

positioning a different one of a plurality of driver coils on a mid portion of a different one of said printed circuit boards;

affixing a plurality of driver magnets to said sides of said substantially straight portion of said flow tubes;

positioning each of said driver magnets between the flow tube to which it is affixed and one of said driver coils with at least two of said magnets being positioned between each driver coil and said pair of said flow tubes;

each of said driver coils being proximate a magnet on each of said flow tubes for vibrating said magnets and affixed flow tubes out of phase when an energizing signal is applied to said driver coils.

16. The method of claim 14 in combination with the steps of:

extending flexure means between said printed circuit boards for interconnecting corresponding ones of said coils on each of said printed circuit boards;

providing connecting means on a mid portion of said flexure means for providing electrical access to said coils on said printed circuit boards;

said connecting means being adapted to be inserted into an opening in an outer shell of said flowmeter when assembled for enabling the electrical interconnection of said coils and external circuitry associated with said flowmeter.

* * * * *